F. A. & J. W. HARTNAGEL.
CORN-PLANTER.
No. 192,694. Patented July 3, 1877.
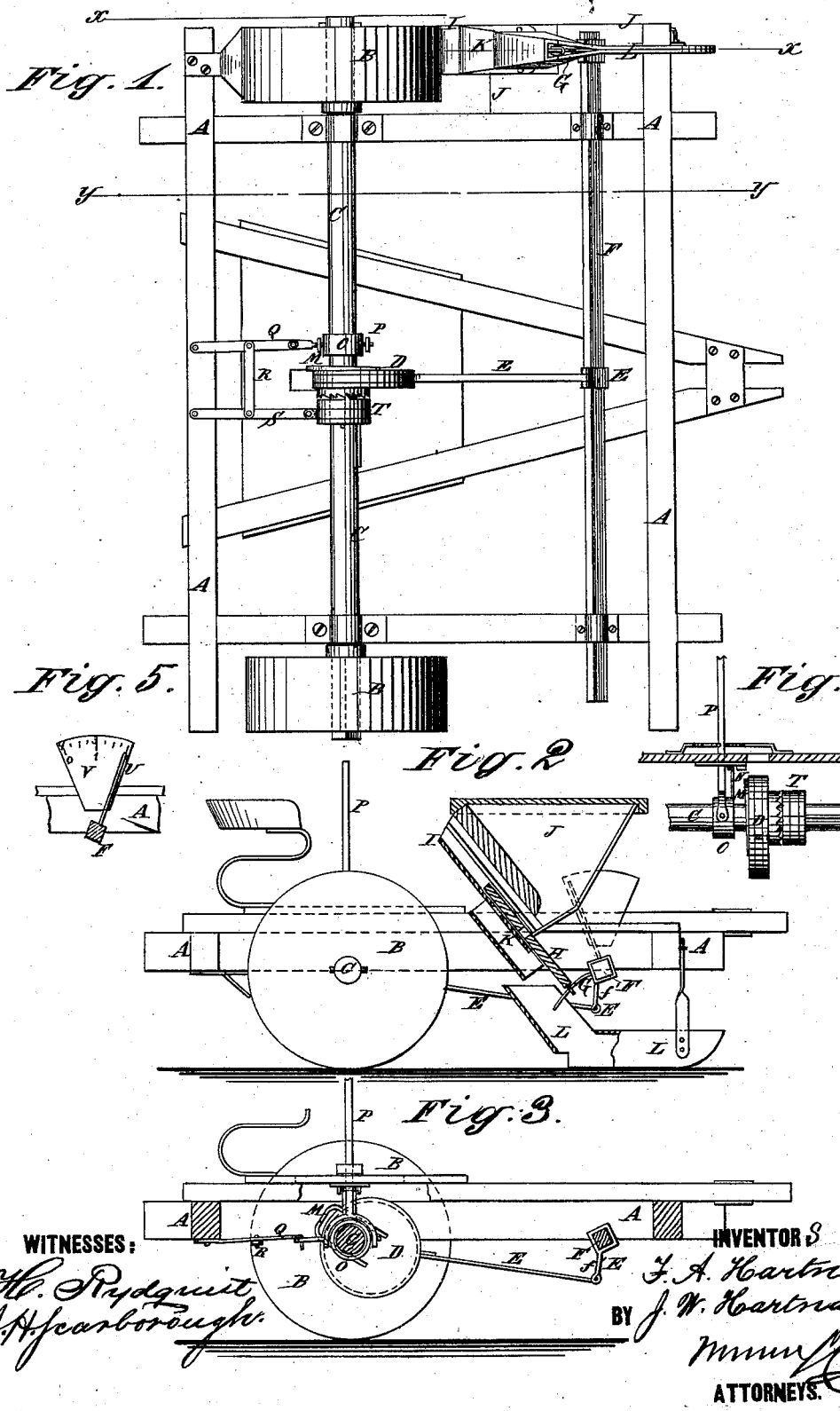

UNITED STATES PATENT OFFICE.

FREDRICK A. HARTNAGEL AND JOHN W. HARTNAGEL, OF ST. LOUIS, MO.

IMPROVEMENT IN CORN-PLANTERS.

Specification forming part of Letters Patent No. 192,694, dated July 3, 1877; application filed March 19, 1877.

*To all whom it may concern:*

Be it known that we, FREDRICK A. HARTNAGEL and JOHN W. HARTNAGEL, of St. Louis, in the county of St. Louis and State of Missouri, have invented a new and Improved Corn-Planter, of which the following is a specification:

In the accompanying drawing, Figure 1 is an under side view of our improved corn-planter. Fig. 2 is a side view of the same, partly in vertical longitudinal section through the line $x\ x$, Fig. 1. Fig. 3 is a vertical longitudinal section of the same, taken through the line $y\ y$, Fig. 1. Fig. 4 is a detail view of the device for throwing the dropping device into and out of gear. Fig. 5 is a detail view of the indicating device.

Similar letters of reference indicate corresponding parts.

The object of this invention is to furnish an improved corn-planter, simple in construction, convenient in use, and reliable in operation, dropping the seed at regular intervals, and so constructed that when the dropping device is thrown out of gear the said device will continue to move on until just ready to drop the seed for another hill, so as to drop the seed as soon as it is again in gear.

The invention will first be described in connection with the drawing, and then pointed out in the claims.

In the drawing, A is the frame of the planter. B are the wheels, one or both of which are rigidly attached to the axle C, so as to carry said axle with it in its revolution. The axle C revolves in bearings in the frame A, and to its middle part is attached an eccentric wheel, D, which is connected by a strap with the end of the connecting-rod E. The other end of the connecting-rod E is pivoted to the end of a short arm, $f'$, rigidly attached to the shaft F. The shaft F rocks in bearings attached to the frame A, and to its ends are attached arms G, which pass through eyes or keepers attached to the lower ends of the dropping-slides H. The dropping-slides H slide up and down in boxes I, attached to the outer surface of the front or rear sides of the seed-hoppers J, and have holes in them of such a size as to hold enough seed for a hill.

The dropping-slides H receive seed through a hole in the lower part of the hopper J, carry it up, and discharge it through a hole in the rear part of the box I into the spout K, attached to the rear side of the slide-box I, and extending downward so as to conduct the seed into the cavity in the rear part of the runner L that opens a channel to receive the seed. The bottom of the hopper J inclines toward the discharge-hole, so that the seed may readily pass out into the dropping-slides. The wheels B in the drawings are represented as being made small, about four feet in circumference, but we prefer to make them about eight feet in circumference.

In this case the rock-shaft F should be placed directly beneath the hopper J, and should be provided with two arms, G, and the hoppers J should be provided with dropping-slides H, slide-boxes I, and conductor-spouts K upon both their front and rear sides, and should also be provided with bottoms inclining from their middle part toward both front and rear. To one side of the eccentric driving-wheel D is attached a U-bar, M, provided with a notch in the outer side of its bend to receive a catch, N, the upper end of which slides in a guide-groove in a plate attached to the under side of the platform of the machine.

The lower end of the catch N is attached to a sleeve, O, placed upon the shaft, C, and to which is pivoted the lower end of the lever P. The lever P passes up through, and is pivoted to the platform of the machine, and also passes through a slotted catch-bar, by which it is held in either position. To the lower end of the lever P, or to the sleeve O, is pivoted the end of the lever Q, the other end of which is pivoted to a bar of the frame A. To the middle part of the lever Q is pivoted the end of a connecting-bar, R, the other end of which is pivoted to the middle part of the lever S. The lever S is placed parallel with the lever Q, and is pivoted at one end to a bar of the frame A. The other end of the lever S is pivoted to the clutch T, sliding upon the shaft C, so that it may be moved forward to clutch the eccentric or driving-wheel D, and cause it to be carried around by and with the said shaft C in its revolution.

With this construction, when the clutch T is moved back to throw the dropping mechanism out of gear, the catch N is moved forward to enter the notch in the U-bar M when the wheel D comes into the proper position so as to stop the dropping mechanism when it is just ready to drop seed. To the rock-shaft F is attached a pointer, U, which, as the said shaft is rocked, moves back and forth across the face of the dial-plate, V, attached to a side bar of the frame A, so as to show in what position the dropping mechanism may be.

Having thus described our invention, we claim as new and desire to secure by Letters Patent—

1. The combination of the notched U-bar M, the sliding catch N, the sleeve O, the two levers Q S, and the connecting-bar R, with the eccentric wheel D, the axle C, the clutch T, and the clutch-lever P, substantially as herein shown and described.

2. The combination of the index U and the dial-plate V with the rock-shaft F that operates the dropping-slides, and with the frame A, substantially as herein shown and described.

FREDRICK A. HARTNAGEL.
JOHN WM. HARTNAGEL.

Witnesses:
JOHN F. MIELERT,
L. RAUSCHKOLB.